S. WESSON.
Machine for Finishing the End of Pen Handle Tubes.
No. 54,455. Patented May 1, 1866.
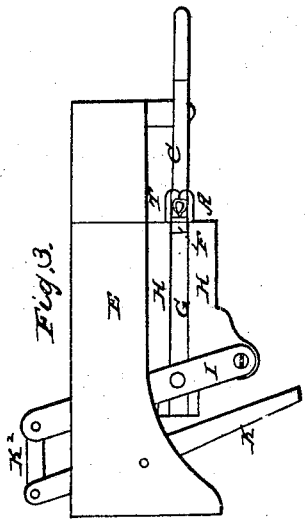
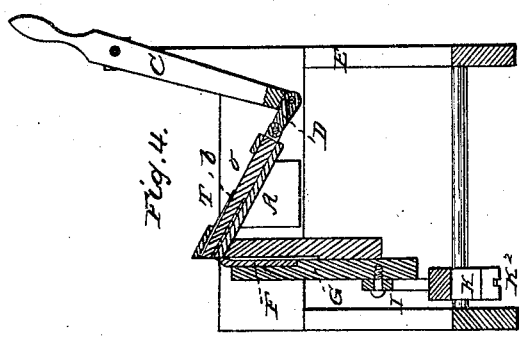
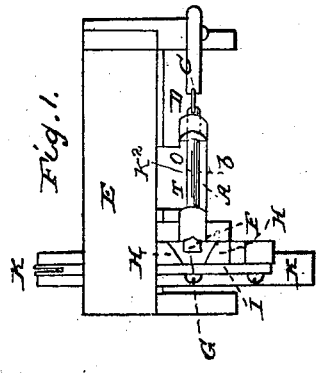
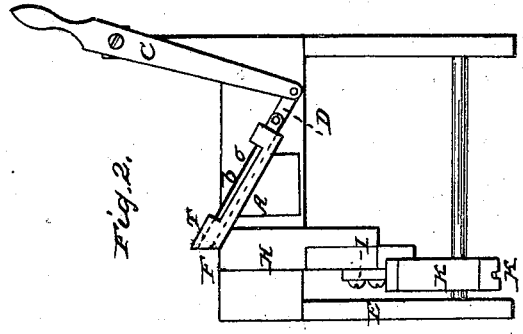

UNITED STATES PATENT OFFICE.

SAMUEL WESSON, OF WORCESTER, MASSACHUSETTS.

IMPROVED MACHINE FOR FINISHING THE ENDS OF PEN-HANDLE TUBES.

Specification forming part of Letters Patent No. 54,455, dated May 1, 1866.

*To all whom it may concern:*

Be it known that I, SAMUEL WESSON, of the city and county of Worcester, of the State of Massachusetts, have invented a new and useful Machine for Finishing the End of the Socket-Tube of a Pen-Handle; and I do hereby declare the same to be fully described in the following specification and represented in the accompanying drawings, of which—

Figure 1 is a top view, Fig. 2 a front elevation, Fig. 3 an end elevation, and Fig. 4, a longitudinal section, of it.

In the drawings, A denotes a tubular socket or external holder, in which there is arranged an internal holder or slide, B, connected to a lever, C, by a pitman, D, the whole being applied to a frame, E, arranged therein, as represented.

A vertical knife or cutter, F, is arranged to slide against the upper end of the holder A, such holder being arranged at an acute angle with the plane of such knife. The knife or cutter is affixed to a carrier, G, which is disposed between vertical guides H H, and is jointed to a lever, I, which is connected to a treadle, K, by a connecting-rod, $K^2$, the same being arranged as represented in Fig. 3.

While the diameter of the bore of the holder A is to correspond with the diameter of the pen-handle tube to be cut in the machine, the diameter of the inner holder should be equal to that of the bore of the pen-handle tube. One of such tubes is shown in side view in Fig. 5 and in under-side view in Fig. 6. The position of the tube when such tube is in the machine is shown at T in Figs. 1, 2, 3, and 4. When advanced to its highest position a shoulder, b, on the internal holder brings up against the lower end of the external holder, in which case the upper end of the internal holder should be even with and a continuation, as it were, of the vertical face of the upper end of the external holder, in order that when the knife or cutter is next elevated it shall be caused to cut off the end of the tube to the bevel and form required, the tube next to where the cut is made being so supported by the two holders as to be prevented from splitting or being bent at its end so cut.

Instead of the reciprocating slide-cutter a rotary cutter or wheel, with mechanism for revolving it, may be employed; but the slide-cutter is preferable in many respects.

In using the machine the pen-handle socket-tube is to be slipped into the outer holder and open the inner one as far as may be desirable; or the tube may be laid in the opening *o* of the outer holder while the inner holder may be drawn back, in which case the inner holder and the tube are to be advanced the proper distances within the outer holder. Next the knife or cutter should be forced upward, so as to cut through the tube.

I claim—

The combination and arrangement of the external and internal holders, A B, and the cutter F, the latter and the internal holder being movable and provided with mechanism for operating them, substantially as described.

SAMUEL WESSON.

Witnesses:
R. H. EDDY,
F. P. HALE, Jr.